United States Patent
Debecker et al.

(10) Patent No.: US 7,219,812 B2
(45) Date of Patent: May 22, 2007

(54) FIBRE-REINFORCED PRESSURE VESSEL AND METHOD OF MANUFACTURING FIBRE-REINFORCED PRESSURE VESSEL

(75) Inventors: Andy Debecker, Delft (NL); Oscar Christoph van der Jagt, Delft (NL); Jan Jacobus Matthijs Koppert, Delft (NL)

(73) Assignee: Advanced Lightweight Constructions Group B.V. (NL)

( * ) Notice: Subject to any disclaimer, the term of this patent is extended or adjusted under 35 U.S.C. 154(b) by 459 days.

(21) Appl. No.: 10/792,193

(22) Filed: Mar. 3, 2004

(65) Prior Publication Data
US 2004/0188445 A1 Sep. 30, 2004

Related U.S. Application Data

(63) Continuation of application No. 09/675,496, filed on Sep. 29, 2000, now abandoned.

(30) Foreign Application Priority Data
Feb. 4, 2000 (NL) .................................... 1014290

(51) Int. Cl.
*F17C 1/06* (2006.01)
(52) U.S. Cl. ...................................... 220/589; 220/588
(58) Field of Classification Search ................ None
See application file for complete search history.

(56) References Cited

U.S. PATENT DOCUMENTS

| | | | |
|---|---|---|---|
| 2,858,992 A | 11/1958 | Wentz | |
| 3,047,191 A | 7/1962 | Young | |
| 3,184,092 A | 5/1965 | George | |
| 3,207,352 A | 9/1965 | Reinhart, Jr. | |
| 3,228,549 A | 1/1966 | Courtney | |
| 3,448,253 A | 6/1969 | Bramblett, II | |
| 4,785,956 A | 11/1988 | Kepler | |

(Continued)

FOREIGN PATENT DOCUMENTS

EP 0 319 439 A2 6/1989

(Continued)

OTHER PUBLICATIONS

Koppert and Beukers (Nov./Dec. 2000) SAMPE Journal 36(6):8-15.

(Continued)

*Primary Examiner*—Stephen Castellano
(74) *Attorney, Agent, or Firm*—Swanson & Bratschun LLC (57) ABSTRACT

The invention relates to a fibre-reinforced pressure vessel (1, 6) comprising a rigid gas- of fluid-tight body (2, 7, 13, 19) overwound with fibre filaments (3, 10,11, 18), whereby the fibre filaments are wound such that at least a number of fibre filaments can freely move with respect to one another and when the pressure vessel is under internal pressure the fibre filaments are loaded exactly in their longitudinal direction.

The invention also relates to a method of manufacturing a fibre-reinforced pressure vessel whereby no matrix material (for example, resin) is used so that at least a number of fibre filaments would be incorporated in a matrix for that section of the pressure vessel in which the fibre filaments can freely move with respect to one another.

26 Claims, 5 Drawing Sheets

U.S. PATENT DOCUMENTS

| | | |
|---|---|---|
| 5,287,987 A | 2/1994 | Gaiser |
| 5,499,739 A | 3/1996 | Greist, III |
| 5,526,994 A | 6/1996 | Murphy |
| 5,822,838 A | 10/1998 | Seal |
| 6,176,386 B1 | 1/2001 | Beukers |
| 6,357,439 B1 | 3/2002 | Cook |
| 2004/0045970 A1 | 3/2004 | Debecker |

FOREIGN PATENT DOCUMENTS

| | | |
|---|---|---|
| EP | 0 666 450 A1 | 8/1995 |
| GB | 703811 | 2/1954 |
| JP | 10119138 | 5/1998 |
| WO | WO 97/12175 | 4/1997 |
| WO | WO 97/17570 | 5/1997 |

OTHER PUBLICATIONS

Rosato & Grove (1964) Polymer Engineering and Technology, p. 216-233, 270-271, Filament Winding: it's development, manufacture, applications and design.

Office Action dated May 12, 2004 from U.S. Appl. No. 10/182,884 (Our Ref.: VE.11).

FIBRE-REINFORCED PRESSURE VESSEL AND METHOD OF MANUFACTURING FIBRE-REINFORCED PRESSURE VESSEL

This application is a continuation of Ser. No. 09/675,496 filed Sep. 29, 2000 now abandoned.

The invention relates to a fibre-reinforced pressure vessel comprising a rigid gas- or fluid-tight body overwound with fibre filaments. The invention also relates to a method of manufacturing a fibre-reinforced pressure vessel comprising a rigid gas- or fluid-tight body overwound with fibre filaments.

Known fibre-reinforced pressure vessels comprise a rigid gas- or fluid-tight body overwound with fibre filaments. During the manufacturing of fibre-reinforced pressure vessels fibre filaments are applied in certain patterns, so that when the pressure vessel is under internal pressure the fibre filaments can absorb tensil stresses. Prior to, during or after winding, a binder or resin (a so-called matrix material) is applied to the body which is (to be) overwound or to the fibre filaments. After winding, the matrix material is cured so that the fibre filaments are incorporated in a matrix (the binder or resin). In fibre-reinforced pressure vessels the matrix serves to transfer shear stresses from one fibre filament to another or to the gas- or fluid-tight body when the pressure vessel is under internal pressure. Sometimes extra windings are applied to (sections of) the gas- or fluid-tight body in order to absorb mechanical loads resulting from inter alia shear stresses.

Known methods of manufacturing fibre-reinforced pressure vessels comprise a solidification or curing step in order to incorporate the wound fibre filaments in a matrix. Curing takes time, usually 6 to 8 hours.

A disadvantage of known pressure vessels and methods of manufacturing the same is the need for a solidification or curing step which usually last 6 to 8 hours. Another disadvantage is that for absorbing mechanical loads resulting from inter alia shear stresses extra windings are sometimes necessary.

It is an objective of the invention to provide an improved pressure vessel. It is another objective of the invention to provide a reduction of production costs of fibre-reinforced pressure vessels. It is yet another objective of the invention to provide an improved method of manufacturing fibre-reinforced pressure vessels.

According to a first aspect of the invention one or more objectives are achieved with a fibre-reinforced pressure vessel comprising a rigid gas- or fluid-tight body overwound with fibre filaments, whereby at least a number of fibre filaments can move freely with respect to one another and the fibre filaments are wound such that when the pressure vessel is under internal pressure the fibre filaments are loaded exactly in their longitudinal direction.

Since the fibre filaments are wound such that, when the pressure vessel is under internal pressure, they are loaded only longitudinally, they will remain in place during use and a matrix will not be required.

It is further achieved that only just as much fibre material needs to be used as is necessary for exactly absorbing the mechanical stresses in the pressure vessel. No extra fibre filaments are necessary, leading to a reduction in weight and to lower costs as compared to known pressure vessels.

Since at least a number of fibre filaments can move freely with respect to one another and the fibre filaments are wound such that when the pressure vessel is under internal pressure the fibre filaments are loaded exactly in their longitudinal direction, the fibre filaments in that section of the pressure vessel will be displaced with respect to one another when the pressure vessel for example is damaged.

Preferably, the fibre filaments can move freely with respect to one another throughout the whole of the pressure vessel.

This is advantageous in that no matrix material (for example, resin) at all needs to be used. This makes a curing step superfluous and it leads to lower costs as compared to known pressure vessels.

Preferably, the pressure vessel according to the invention has an isotensoid shape, that is, a shape whereby when the pressure vessel is under internal pressure the mechanical stresses are distributed equally among the fibre filaments. In order to provide the pressure vessel with the desired isotensoid shape a means for axially strengthening the pressure vessel may be used.

Since an isotensoid shape is used, only a minimum number of fibre filaments are needed in order to absorb the mechanical stresses in the pressure vessel.

Moreover preferably, the pressure vessel according to the invention has a cylindrical shape which is provided with isotensoid end pieces at both longitudinal ends thereof.

By providing the pressure vessel with a cylindrical shape, it is suitable for use as a gas flask.

Preferably, the pressure vessel according to the invention is provided with a protective layer, a so-called coating.

A coating comprising synthetic rubber is particularly suitable as a protective means against fire and against small impact and handling loads.

Preferably, the rigid body of a pressure vessel according to the invention is made of high-density polyethene (HDPE) and the fibre filaments are carbon filaments.

This combination of materials is advantageous from the viewpoint of production costs and the weight and strength of the pressure vessel.

Preferably, the rigid body of a pressure vessel according to the invention is made of high-density polyethene (HDPE) and the fibre filaments are glass fibres.

This combination of materials, too, is advantageous from the viewpoint of production costs and the weight and strength of the pressure vessel.

A pressure vessel according to the invention can be manufactured in different embodiments and thus be made suitable for different maximum internal pressures.

According to a second aspect of the invention one or more objectives are achieved through a method of manufacturing a fibre-reinforced pressure vessel comprising a rigid gas- or fluid-tight body overwound with fibre filaments, whereby the method of manufacturing comprises the steps of:
a) providing a rigid gas- or fluid-tight body, fibre filaments and a winding apparatus;
b) overwinding the rigid body such that at least a number of fibre filaments can move freely with respect to one another and the fibre filaments are wound such that when the pressure vessel is under internal pressure the fibre filaments are loaded exactly in their longitudinal direction;
   whereby no matrix material (for example, resin) is provided such that the fibre filaments would be incorporated in a matrix for that section of the pressure vessel in which the fibre filaments can move freely with respect to one another.

By this it is achieved that no more fibre material is used than that what is necessary for exactly absorbing the mechanical stresses in the pressure vessel. This leads to a reduction of the costs of manufacturing of the pressure vessel.

Preferably, no matrix material at all is provided for in the method according to the invention. By not providing for a matrix material in the pressure vessel a curing step is made superfluous. By this a shortening of the production time is achieved with respect to the time which would otherwise be needed for solidification or curing, which usually is 6 to 8 hours.

The invention is illustrated by way of two embodiments of the pressure vessel and one embodiment of the method of manufacturing the pressure vessel with reference to the accompanying drawings.

Figure 1:
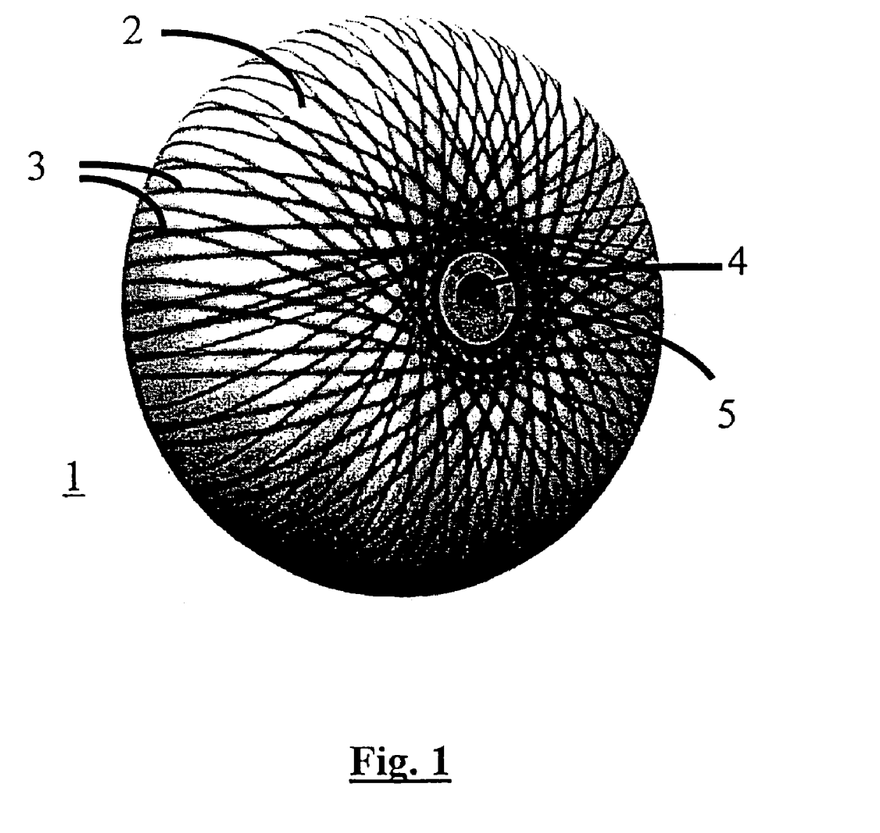
FIG. 1 depicts a first embodiment of the pressure vessel according to the invention having an isotensoid shape.
Figure 2:
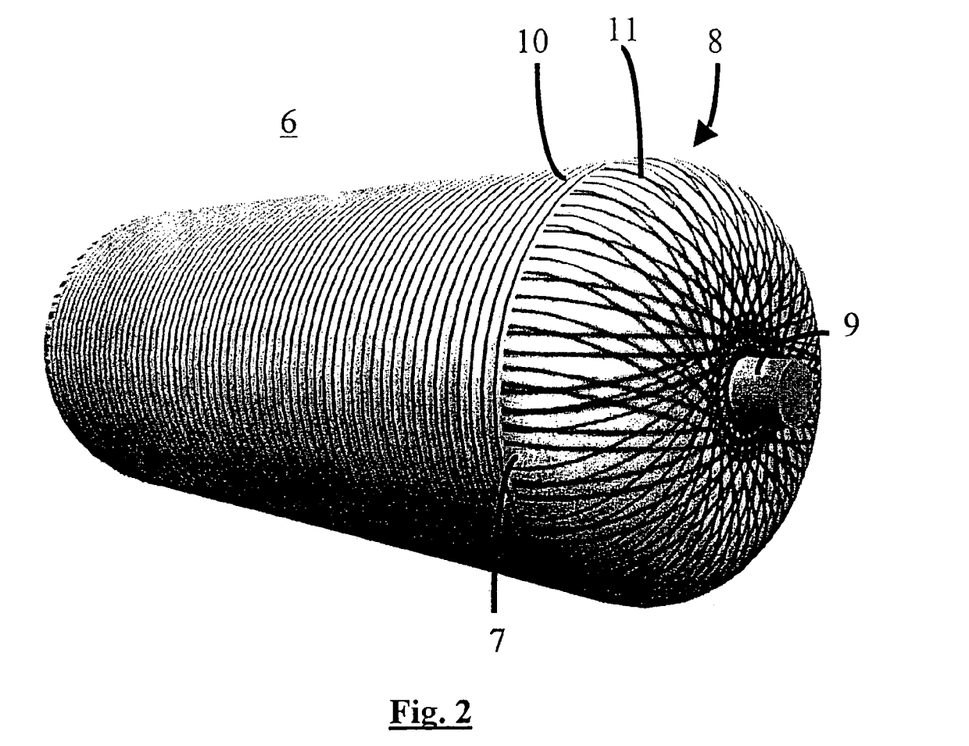
FIG. 2 depicts a second embodiment of the pressure vessel according to the invention having a cylindrical shape.

Referring to the drawings the two given embodiments of the pressure vessel according to the invention are now described.

FIG. 1 depicts a first embodiment of the pressure vessel according to the invention. The pressure vessel (1) comprises a rigid gas- or fluid-tight body (2) having an isotensoid shape. There are fibre filaments (3) wound around the rigid body (2). There is also an auxiliary means (4). In this example the auxiliary means (4) is a means for axially strengthening the pressure vessel (1). The auxiliary means (4) is provided with means (5), screw holes in this example, with which an appendage (not shown) such as a closure member or a pressure valve can be attached to the pressure vessel (1).

FIG. 2 depicts a second embodiment of the pressure vessel according to the invention. The pressure vessel (6) comprises a rigid gas- or fluid-tight body (7) having a cylindrical shape. The cylindrical body (7) is provided with an end-piece (8) having an isotensoid shape. The cylindrical rigid body (7) is shown mounted on a rotation-axis (9) which is used for winding fibre filaments around the rigid body (7). The rigid body (7) has several filaments (10) overwound in the circumferential direction of the rigid body (7) (so-called 'hoop windings') and several filaments (11) overwound in the longitudinal direction of the rigid body (7) (so-called 'helical or polar windings').

The rigid body may comprise a thin layer of metal, a thermoplastic or thermo-setting material, provided that the material meets the safety specifications applicable for the substance to be contained in the pressure vessel.

The fibre material is preferably carbon fibre, but it can also be any other fibre type which can be subjected to tensile stresses, such as E-type, R-type or S-type glass fibre, paramide fibre, carbon fibre or fibres of polymers such as polyethene, polyester or polyamide.

Figure 3:
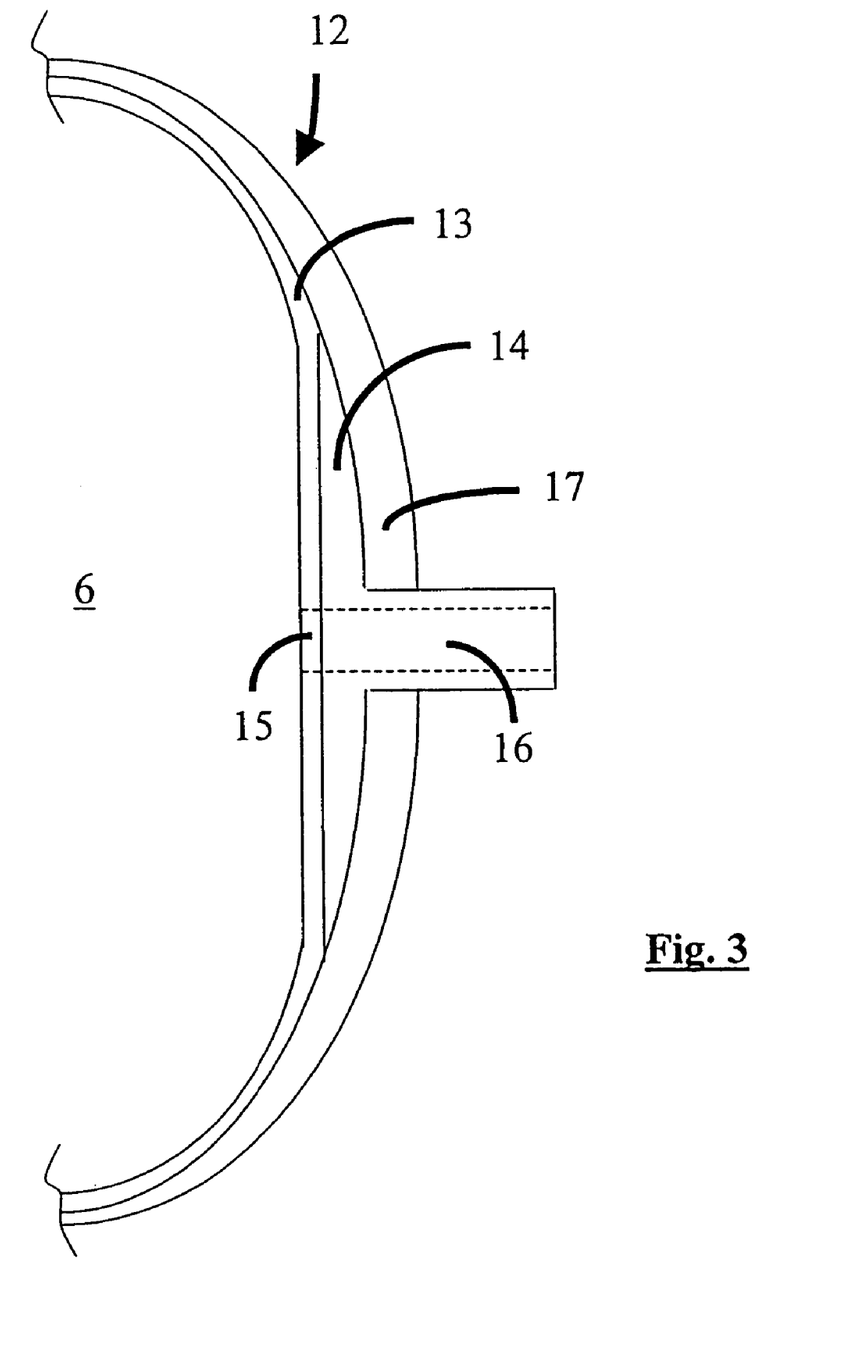
FIG. 3 is an axial cross-section view of an end of the pressure vessel of FIG. 2.

FIG. 3 depicts an axial cross-section view of an end of the pressure vessel (6) according to FIG. 2. It shows an end (12) of the cylinder-shaped rigid gas- or fluid-tight body (13) and an auxiliary member (14) bordering the rigid body (13). In this example the auxiliary member (14) and the rigid body together provide the end (12) with an isotensoid shape. In this example there are also openings (15) and (16) in the axial direction of the pressure vessel (6). This embodiment also depicts how the rigid body (13) and the auxiliary member (14) together have been overwound with a layer (17) of fibre filaments (which are shown schematically).

Figure 4A:
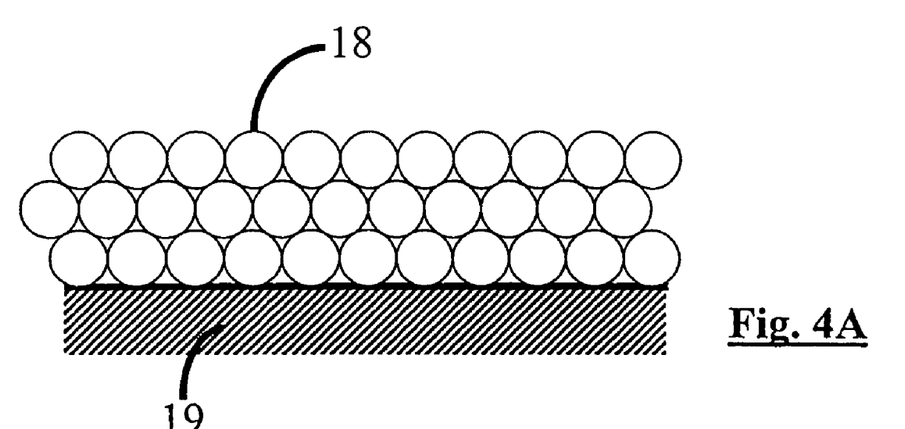
FIGS. 4A and 4B depict cross-sectional views of an example of the rigid body of a pressure vessel with fibre filaments abutting the rigid body according to the invention.
Figure 4B:
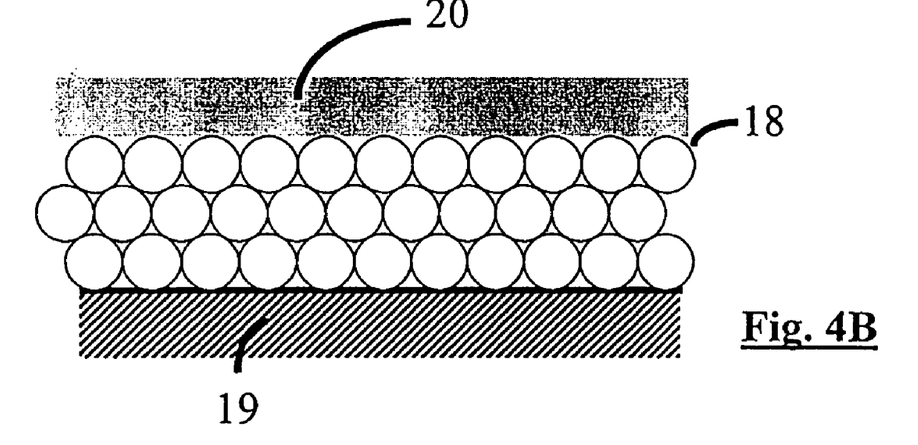

FIGS. 4A and 4B depict cross-sectional views of an example of the positions of fibre filaments (18) lying against (abutting) the rigid body (19) of a pressure vessel according to the invention. In this example the fibre filaments (18) are in a cubic closest packing. FIG. 4B also shows a coating (20) which has been applied to the fibre filaments.

Figure 5:
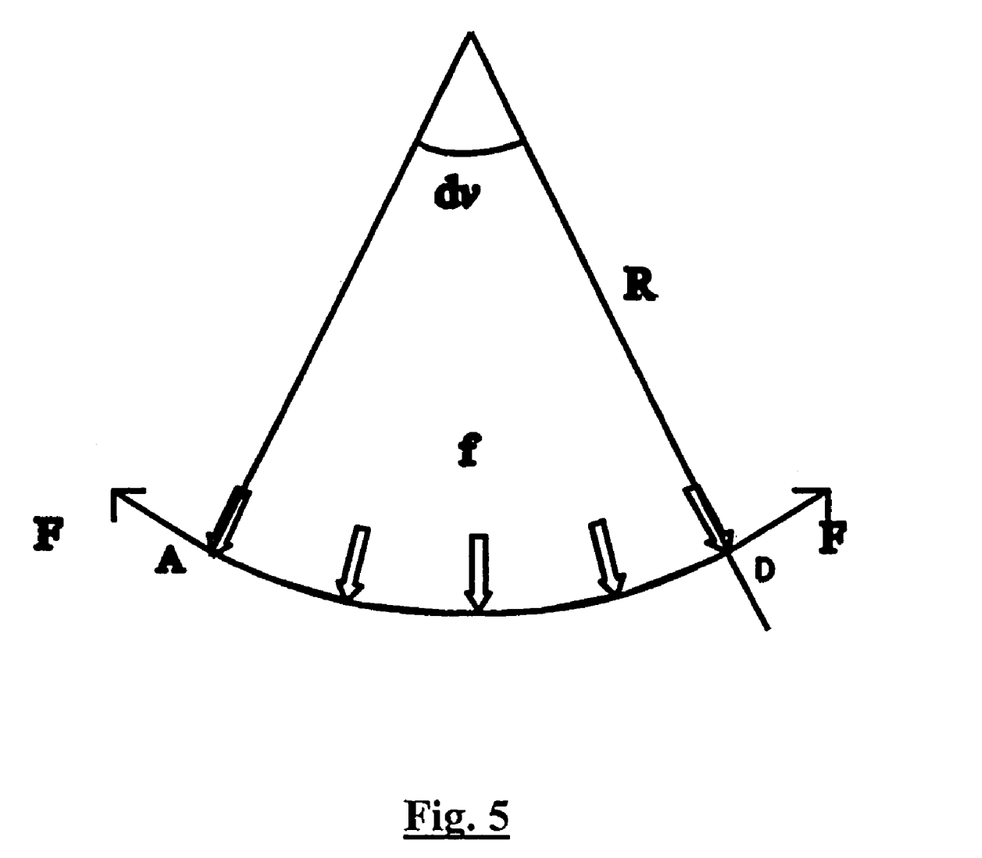
FIG. 5 depicts schematically the mechanical load on a fibre filament in its longitudinal direction according to the invention.

FIG. 5 depicts the load with respect to an arc (AD) of a fibre filament when the pressure vessel is under internal pressure (f) and the resulting reaction force (F) of the arc (AD) of the fibre filament R represents the radius of the rigid body and dv represents the arc angle. The fibre filament, of course, also exerts a normal force on the rigid body.

The following is a description of an example of the method of manufacturing—according to the invention—a fibre-reinforced pressure vessel comprising a rigid gas- or fluid-tight body overwound with fibre filaments.

One first determines the function of the pressure vessel and selects the materials to be used for the pressure vessel. Next, one determines a design, that is, the shape of the apparatus including parameters such as the volume and dimensions of the vessel, the maximum allowable internal pressure, safety factors, and the dimensions of the outflow openings in the pressure vessel. A suitable production process is also selected. According to the invention the process is winding with fibres ('filament winding'). For this process one determines a winding pattern appropriate in regard of the shape of the pressure vessel whereby in the winding pattern the fibre filaments are overwound such that at least a number of fibre filaments can move freely with respect to one another and when the pressure vessel is under internal pressure the fibre filaments are loaded exactly in their longitudinal direction. The rigid body thereby is not to contribute to the absorption of mechanical stresses resulting from the internal pressure. The rigid body can be manufactured according to any known method, for example a method using a mould and blow moulding or spray moulding or rotation moulding. Subsequently, the rigid body is mounted on a winding apparatus ('filament winding machine'). After setting the controls of the winding apparatus the leading end of a filament to be wound is attached to the rigid body, the rigid body is overwound and the end of the wound filament is fastened. Sometimes the winding pattern is applied in several stages. In the case of a cylinder-shaped rigid body for example, filaments overwound in the circumferential direction (so-called 'hoop windings') and filaments overwound in the longitudinal direction (so-called 'helical or polar windings') are, for example, applied separately. When applying filaments in the longitudinal direction (so-called 'helical or polar windings') first an auxiliary member is positioned against the rigid body and then the auxiliary member is also overwound with fibre filaments. After the rigid body has been completely overwound, the pressure vessel is optionally provided with a coating, preferably of synthetic rubber. The pressure vessel is optionally provided with an appendage.

The fibres are applied by means of winding, so-called filament winding. Since the fibre filaments are overwound such that, when the pressure vessel is under internal pressure, they are loaded only in their longitudinal direction, they will stay in position during use and a matrix will not be necessary. Preferably, no matrix material (for example, resin) at all is provided.

The fibres are not impregnated or glued or fastened to the rigid body, of course except for the leading end of the very first fibre filament to be overwound. Attachment of the fibre filament can also take place by forming a knot in the fibre filament Impregnation is usually understood to include partial or complete penetration of any matrix material in or between the fibre filaments. Thus, in the pressure vessel according to the invention no matrix material penetrates in or between the fibre filaments because no matrix material is used. Matrix material is usually a resin, synthetic resin or an elastomer. Furthermore, the rigid body can move freely with respect to the fibre filaments.

In the method according to the invention there is no solidification or curing step at all, thus not prior to, during or after winding.

Optionally, a flexible or a rigid protective layer, a so-called coating, can be provided on top of the fibre filaments. This coating is fire-proof and not constructively supporting, and it serves only to protect the fibre filaments against external influences such as cutting or abrasive actions, chemicals and against the influence of humidity or light. Provision of this coating is not essential for performing the primary function of a pressure vessel namely safe containment of a substance under pressure.

The coating, if provided for, can be formed from an elastomer or it can comprise a rigid shell of metal or of a thermplastic or thermo-setting material. Preferably, the coating is made of synthetic rubber.

A pressure vessel according to the invention can be used in particular for containing or transporting substances under pressure, such as propane, butane, CNG (compressed natural gas), air, water and cryogen substances such as liquid nitrogen or liquid oxygen. Depending on the substance to be contained or transported, a pressure vessel according to the invention can be manufactured for a working pressure of 0–5 bar (for example for hot water in an expansion vessel), 0–10 bar (for example for liquid oxygen or liquid nitrogen or for propane gas or butane gas or a mixture thereof in gas flasks intended for use in households and at ambient temperatures), 0–35 bar (for example for propane gas or butane gas at elevated temperatures), 0–100 bar (for example for LPG in fuel tanks intended for use in motor vehicles), 0–300 bar (for example for CNG or compressed air), and 0–600 bar for cryogenic gas systems in space technology applications.

The invention described above has the impact of a breakthrough in the field of winding technology, in particular by overcoming the technical prejudice that use of a matrix material such as a resin is essential for fibre-reinforced pressure vessels. The invention is therefore considered to have a broad scope and not to be limited to only the above-described embodiments.

The invention claimed is:

1. A fibre-reinforced pressure vessel comprising one of a gas- or fluid-tight body overwound with fibre filaments, the fibre-reinforced pressure vessel having no matrix material preventing movement of the fibre filaments with respect to one another and the fibre filaments being wound such that when the pressure vessel is under internal pressure, the fibre filaments are loaded exactly in their longitudinal direction and the body does not substantially contribute to the absorption of mechanical stresses resulting from the internal pressure.

2. The fibre-reinforced pressure vessel according to claim 1 further comprising the pressure vessel having an isotensoid shape.

3. The fibre-reinforced pressure vessel according to claim 1 further comprising the pressure vessel having a cylindrical shape.

4. The fibre-reinforced pressure vessel according to claim 1, further comprising the pressure vessel being provided with a coating.

5. The fibre-reinforced pressure vessel according to claim 4, whereby the coating comprises synthetic rubber.

6. The fibre-reinforced pressure vessel according claim 1 further comprising the body being made of high-density polyethene (HDPE) and the fibre filaments are carbon fibres.

7. The fibre-reinforced pressure vessel according to claim 1 further comprising the body being made of high-density polyethene (HDPE) and the fibre filaments being glass fibres.

8. The fibre-reinforced pressure vessel according to claim 1 further comprising the pressure vessel being configured to withstand a working pressure in the range of 0–5 bar.

9. The fibre-reinforced pressure vessel according to claim 1 further comprising the pressure vessel being configured to withstand a working pressure in the range of 0–10 bar.

10. The fibre-reinforced pressure vessel according to claim 1 further comprising the pressure vessel being configured to withstand a working pressure in the range of 0–35 bar.

11. The fibre-reinforced pressure vessel according to claim 1 further comprising the pressure vessel being configured to withstand a working pressure in the range of 0–100 bar.

12. The fibre-reinforced pressure vessel according to claim 1 further comprising the pressure vessel being configured to withstand a working pressure in the range of 0–300 bar.

13. The fibre-reinforced pressure vessel according to claim 1 further comprising the pressure vessel being configured to withstand a working pressure in the range of 0–600 bar.

14. The fibre-reinforced pressure vessel according to claim 8, further comprising the pressure vessel being suitable for use as a gas flask for propane or butane or a mixture thereof for household uses.

15. The fibre-reinforced pressure vessel according to claim 11 further comprising the pressure vessel being suitable as a fuel tank for LPG for use in motor vehicles.

16. The fibre-reinforced pressure vessel according to claim 12 further comprising the pressure vessel being suitable as a fuel tank for CNG or compressed air.

17. The fibre-reinforced pressure vessel according to claim 13 further comprising the pressure vessel being suitable for use as a cryogenic gas system in space technology applications.

18. The fibre-reinforced pressure vessel according to claim 1 further comprising the pressure vessel being provided with an appendage, for example at least one of a closure member or a pressure valve.

19. A method of manufacturing a fibre-reinforced pressure vessel comprising one of a gas- or fluid-tight body overwound with fibre filaments, whereby the method comprises the steps of:

a) providing one of a gas- or fluid-tight body and fibre filaments;

b) overwinding the body with the fibre filaments such that the fibre filaments are wound such that when the pressure vessel is under internal pressure the fibre filaments are loaded exactly in their longitudinal direction and the body does not substantially contribute to the absorption of mechanical stresses resulting from the internal pressure; and whereby no matrix material preventing movement of the fibre filaments relative to one another is provided or at least a portion of the pressure vessel.

20. The fibre-reinforced pressure vessel according to claim 1, wherein the pressure vessel includes opposite end portions with isotensoid-shaped continuous surfaces and a cylindrical portion connecting said isotensoid end portions, said fibre filaments being wound circumferentially on said cylindrical portion and longitudinally on said end portions.

21. The method of manufacturing according to claim 19, comprising forming the body with end portions constituted by reinforcing members with isotensoid surfaces of unidirectional curvature.

22. The fibre-reinforced pressure vessel according to claim 1, wherein the body has exclusively a positive curvature.

23. A fibre-reinforced pressure vessel comprising:
one of a gas- or fluid-tight body; and
fibre filaments overwinding the body, the fibre-reinforced pressure vessel having no matrix material preventing movement of the fibre filaments with respect to one another, the fibre filaments being arranged over the body such that when the pressure vessel is under internal pressure the fibre filaments support substantially all mechanical stresses resulting from the internal pressure.

24. The fibre reinforced pressure vessel according to claim 1, further comprising a protective layer on top of the fibre filaments.

25. The fibre reinforced pressure vessel according to claim 24, wherein the protective layer comprises elastic material.

26. The fibre reinforced pressure vessel according to claim 25, wherein the elastic material comprises synthetic rubber.

* * * * *